Patented May 15, 1945

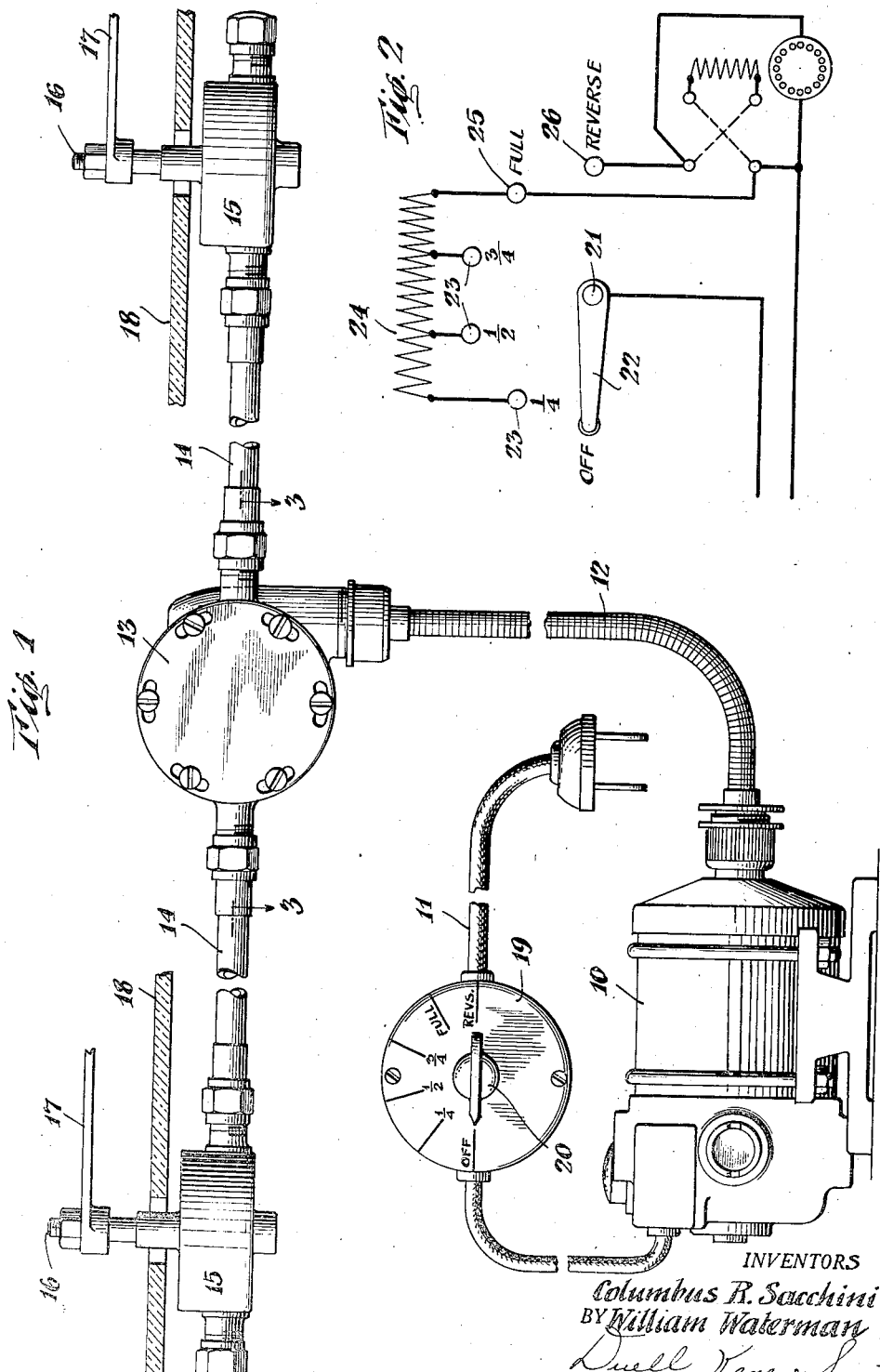

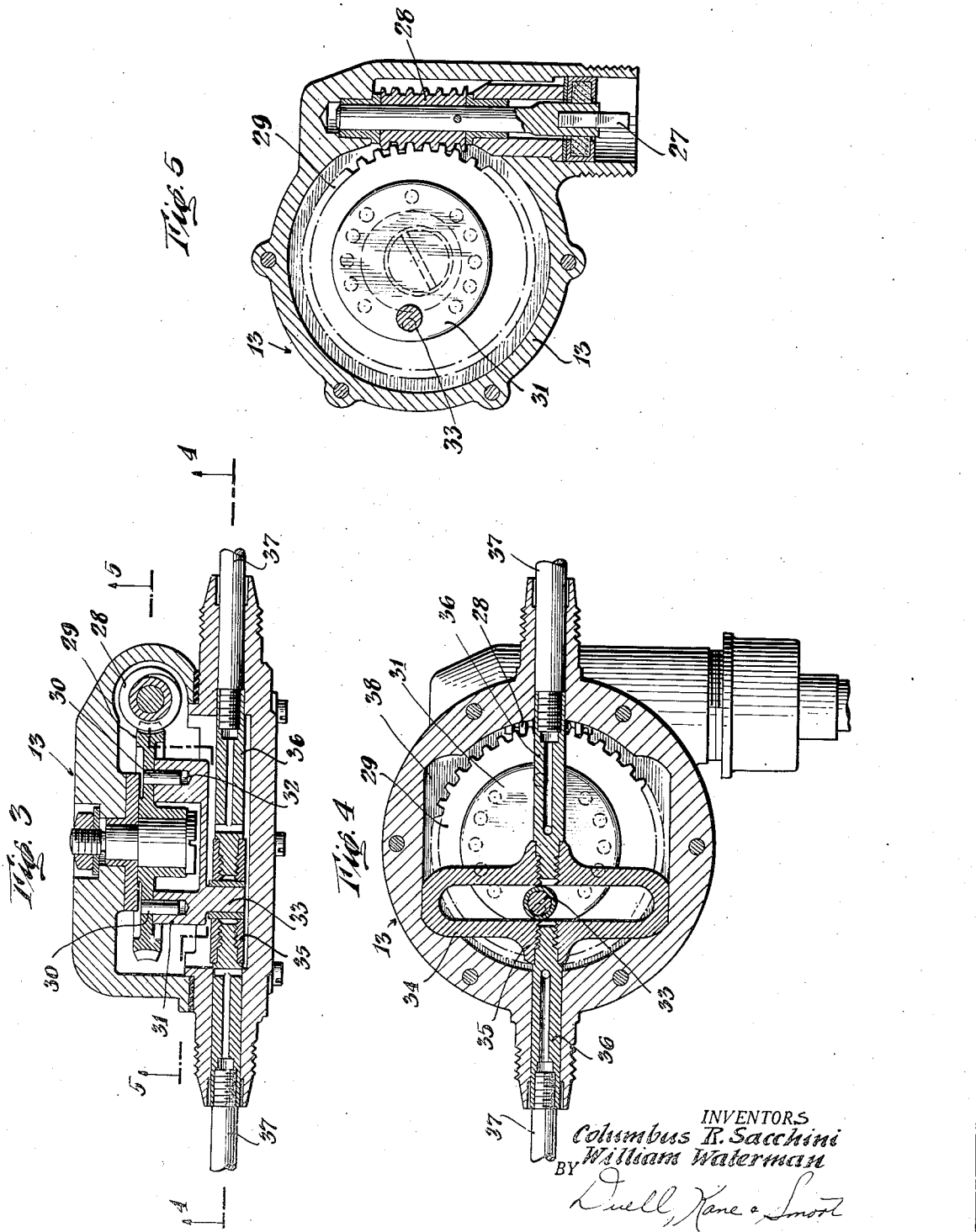

2,376,010

UNITED STATES PATENT OFFICE 2,376,010

WINDSHIELD WIPER MECHANISM

Columbus R. Sacchini, Cleveland, and William Waterman, Shaker Heights, Ohio, assignors to The Aerotorque Company, Cleveland, Ohio, a corporation of Connecticut Application November 19, 1941, Serial No. 419,734

11 Claims. (Cl. 74—70)

This invention relates to a structurally improved windshield wiper mechanism and in its more specific aspects aims to provide an apparatus of this type particularly intended for use in aircraft and other installations requiring reliable operation under adverse conditions.

It is an object of the invention to furnish a windshield wiper mechanism which will be susceptible to adjustment, so that it may be capable of somewhat universal installation, it being therefore unnecessary to provide separate types or models of the mechanism for each installation which differs in detail from another installation. As a consequence, an apparatus is furnished which may be produced in quantities at a relatively nominal figure.

A further object of the invention is that of providing mechanism of this type and which may be driven with equal facility by a source of power of either the fluid or electrical class, although preferably, according to the teachings of the present invention, an electric motor will be employed as a prime mover and will form a part of the novel design.

Another object is that of furnishing a windshield wiper mechanism and by means of which the parts may be adjusted by a relatively inexperienced operator so that the squeegee or blade elements actually performing the cleaning operation will traverse a given field over the surface of the windshield, or may else traverse fields of larger or smaller area, as may be desired or necessary according to the needs of any particular installation.

Another object is that of furnishing a mechanism of this type and which will embody relatively few parts, each individually simple and rugged in construction, these parts being capable of ready assemblage and, when so assembled, operating over long periods of time with freedom from all difficulties.

With these and other objects in mind, reference is had to the attached sheets of drawings illustrating one practical embodiment of the invention, and in which:

Fig. 1 is a plan view of the complete mechanism;

Fig. 2 is a view of the circuit which may be included as part of this mechanism;

Fig. 3 is a somewhat enlarged and sectional side view taken along the lines of 3—3 and in the direction of the arrows as indicated in Fig. 1; and Figs. 4 and 5 are similar sectional views taken respectively along the lines 4—4 and 5—5 and in the direction of the arrows as indicated in Fig. 3.

Referring primarily to Fig. 1, the reference numeral 10 indicates the casing of an electric current motor which is supplied with energy through a lead 11. Coupled to the power shaft of the motor is a torque cable or driving connection 12 which extends through to a casing 13. Within the latter, a hereinafter described mechanism is disposed. This mechanism serves to reciprocate control elements conveniently housed within tubes 14; such controls being conveniently of the well-known push-pull type. These in turn connect with mechanisms within housings 15 and which mechanisms, in accordance with well-known practice, may include ordinary rack and pinion elements. The latter serve to operate shafts 16 conveniently extending beyond the surface of the windshield 18 or other elements to be cleaned. Attached to these shafts are arms 17 which, in turn, support blades or squeegee elements (not shown); the latter serving to contact and clean the surface of the panel 18.

A casing 19 may be interposed in the lead 11 and a handle 20 may extend from this casing. Upon the face of the casing and as shown in the drawings various positions may be indicated. Disregarding the adjustment of the switch mechanism which is coupled to the handle, it will be understood that with the motor 10 operating, power will be transmitted to the mechanism within the casing 13 by the cable 12. This will result in reciprocation of the controls within the tubes 14 and oscillation of the shafts 16 and the arms connected therewith. Of course, if a different form of movement is to be imparted to the arms, this may readily be done by the particular mechanism enclosed within the housings 15 or their equivalents and having in mind that that particular structure forms no part of the present invention.

Referring to Fig. 2, it will be seen that the handle 20, as illustrated in Fig. 1 serves to rotate a shaft 21. Secured to the latter is a switch arm 22. By proper manipulation of the handle, such arm may be caused to selectively engage any one of the series of contacts 23 which are associated with the resistance 24. This resistance is arranged in series with the motor 10, with the switch arm so engaging these contacts. When the arm is in engagement with contact 25, the full power of the electric current supplied through the lead 11 will be exerted on the motor and, with the arm 22 engaging contact 26, the motor will have its direction of rotation reversed. As a consequence of this construction or its functional equivalent, it is obvious that the motor may be operated to produce various ranges of power or to have its direction of rotation reversed, in the event that such a functioning of the parts appears desirable to the pilot or other operator for the purpose of loosening accumulations of ice and sleet on the surface to be cleaned. The switch handle 20 may be flicked quickly by the pilot or copilot from "full" forward to "reverse" positions (see Figs. 1 and 2), thus obtaining a ramming action by the wiper arm or arms connected with the converter mechanism whereby effectively to dislodge such accumulations of ice and sleet. Since, in such ramming operation, the surface would at least be partially cleaned adjacent the zone of operation it is practical without subjecting the electrical equipment to any likelihood of damage to cause the wiper blades to exert considerable ramming power as by application of full current to the motor in said full and reverse positions. It is obvious as the wiper blades, under the foregoing procedure, gradually clean or remove the accumulations from the windshield that a zone will be cleared corresponding to and identical with the normal zone traversed by the blade under usual conditions of operation. When such clearance has once been effected, then the switch may be left in any desired position. Thereupon, without manual supervision, the apparatus will continue to function in a normal manner.

Now referring especially to Figs. 3, 4 and 5 which illustrate in detail the mechanism enclosed within casing 13, it will be seen that the numeral 27 indicates the unit which is to be connected with the torque cable 12 or its functional equivalent. This member is rotatably supported within an extended portion of the housing 13 and is secured to a worm 28. The latter meshes with a worm wheel 29 rotatably supported by the casing 13. Pins 30 are mounted by the wheel 29 and project outwardly from the face of the same. These pins are disposed to one side of the center of rotation of the worm wheel.

A plate, 31, formed with an annular series of recesses or openings 32, is provided and adapted to be mounted upon the pins 30 by having the latter extend into a pair of the recesses 32. Projecting from the face of the plate 31 is a crank pin 33 which may be encircled by a bushing, if desired. This pin extends within the slot of a yoke member 34. The latter may be formed with projecting portions 35 to which extensions 36 are coupled. The control elements, 37 which extend within the tubes 14, are secured to these extensions.

In operation, it will be understood that, with the worm rotating, the worm wheel will be driven. With plate 29 mounted upon the latter, the crank 33 will be similarly rotated and as a unit with the worm wheel. Incident to the movement of the pin 33 through a circular path, the yoke will be reciprocated throughout the guiding recess 38 to correspondingly move the control elements 37.

With the control elements reciprocating, it will be understood that the mechanisms within housings 15 will be operated to correspondingly operate shafts 16. In certain installations, and if oscillation of these shafts is desired, such movement should preferably be through an arc of, for example, 60°. In other installations, it might be desirable to increase the arc of movement to, for example, 90° or 120°. Under such circumstances, all that is necessary is for the operator to detach the plate 29 from the pins 30 and, after rotating the plate with respect to the worm wheel a given distance to cause the pins 30 to enter into the adjacent recesses 32. Accordingly, the degree of eccentricity of the plate and consequently the crank 33 will be increased or decreased. With such increase and decrease, the degree of reciprocation of the yoke 34 will be increased or decreased to thus obtain the desired results.

Thus, among others, the several objects of the invention as specifically afore noted are achieved. Obviously, numerous changes in construction and rearrangement of the parts might be resorted to without departing from the spirit of the invention as defined by the claims.

Attention is directed to the copending application of Columbus R. Sacchini, Serial No. 463,747, filed October 29, 1942, showing and claiming characteristics of a windshield wiper mechanism similar to that disclosed hereby.

We claim:

1. In a windshield wiper mechanism, a rotatably mounted member, a drive for rotating said member, a second member mounted by said first-named member, a driven element operatively coupled to said second member and to be moved thereby and a pair of pins extending from one of said members, the second of said members being formed with an annular series of recesses, a pair of which will receive said pins; the entrance of said pins into said recesses determining the relative positions of said members with respect to each other.

2. A windshield wiper mechanism including in combination a driving shaft, a worm coupled thereto, a worm wheel rotatably mounted and engaging said worm to be driven thereby, a plate in face to face operative contact with the worm wheel, a crank extending from said plate, and means including a pin and socket connection between the plate and wheel operable to position the plate in several turned positions on the worm wheel for coupling said plate with said wheel and whereby said crank may be positioned greater and lesser distances from the center of said wheel.

3. A windshield wiper mechanism including in combination a wheel, means for rotatably mounting the same, a plate, a crank extending from said plate, said plate being formed with an annular series of recesses, pins extending from said wheel and to one side of the center thereof and a crank projecting from the outer face of said plate.

4. A windshield wiper mechanism including in combination a housing, a worm rotatably mounted by said housing, a worm wheel also rotatably mounted by said housing and to be driven by said worm, a yoke reciprocable within said housing, control elements extending from said yoke and connected thereto, pins extending from the face of said worm wheel and to one side of the center thereof, a plate formed with an annular series of recesses adapted to selectively receive said pins and a crank extending from said plate and into said yoke member to reciprocate the latter as said wheel and plate are rotated.

5. A windshield wiper mechanism including in combination a housing, a worm rotatably mounted by said housing, a worm wheel also rotatably mounted by said housing and to be driven by said worm, a yoke reciprocable within said housing, control elements extending from said yoke and connected thereto, pins extending from the face of said worm wheel and to one side of the center thereof, a plate formed with an annular series of recesses adapted to selectively receive said pins, a crank extending from said plate and into said yoke member to reciprocate the latter as said wheel and plate are rotated and a cover for said housing and maintaining said yoke, plate and wheel in proper positions with respect to each other.

6. A windshield wiper mechanism including in combination a housing, a worm rotatably mounted in said housing, a worm wheel also rotatable within said housing and operatively engaged by said worm, push-pull elements extending in opposite directions from and having their inner ends adjacent said housing, their outer ends being adapted to be operatively connected to squeegee-operating shafts to oscillate the latter, means connecting said worm wheel respectively with said elements whereby, in response to rotation of the former, the latter will be reciprocated, and a cover for said housing oppositely bored to form bearings slidably guiding said elements for operation.

7. A windshield wiper mechanism including in combination a housing, a worm rotatably mounted in said housing, a worm wheel also rotatable within said housing and operatively engaged by said worm, push-pull elements extending in opposite directions from and having their inner ends slidably guided by said housing, their outer ends being adapted to be operatively connected to squeegee-operating shafts to oscillate the latter, means connecting said worm wheel with said elements whereby, in response to rotation of the former, the latter will be reciprocated, and a cover forming a part of said housing, said cover being provided with guides slidably supporting the inner ends of said elements.

8. A windshield wiper mechanism including in combination a housing, a worm rotatably mounted in said housing, a worm wheel also rotatable within said housing and operatively engaged by said worm, push-pull elements extending in opposite directions from and having their inner ends slidably guided by said housing, their outer ends being adapted to be operatively connected to squeegee-operating shafts to oscillate the latter, a plate adapted to be arranged in face-to-face contact with said worm wheel and to assume varying degrees of eccentricity with respect to the same, means for normally preventing a movement between said plate and said worm wheel, a crank extending from said plate, a yoke member cooperative with said crank to be reciprocated by the latter as said worm wheel and plate are turned and said yoke member being connected to the inner ends of said elements.

9. A windshield wiper mechanism including in combination a housing, a worm rotatably mounted in said housing, a worm wheel also rotatable within said housing and operatively engaged by said worm, push-pull elements extending in opposite directions from and having their inner ends slidably guided by said housing, their outer ends being adapted to be operatively connected to squeegee-operating shafts to oscillate the latter, a plate adapted to be arranged in face-to-face contact with said worm wheel and to assume varying degrees of eccentricity with respect to the same, means for normally preventing a movement between said plate and said worm wheel, a crank extending from said plate, a yoke member cooperative with said crank to be reciprocated by the latter as said worm wheel and plate are turned, said yoke member being connected to the inner ends of said elements, and said housing being formed with a guideway to confine the movements of said yoke member.

10. In a motion converter, a rotary driving member of disc-like form, a crank-pin-supporting plate member, reciprocating means operatively associated with the crank pin so as to be driven thereby, means for attaching the pin supporting member against one main face of the driving member selectively in a plurality of turned positions, said means comprising a circularly arranged series of diametrically paired attachment holes in one of said members lying along a circle eccentric to the axis of rotation of the driving member, and paired fasteners for securing said members together, said fasteners being arranged selectively to occupy different pairs of said holes.

11. In a motion converter, in combination, a drive wheel of disc-like form having a central bearing support projecting in one direction from the plane of the disc, a deflection-resisting thrust bearing plate in contact with the opposite side of the wheel remotely of the wheel axis, a crank-pin-supporting plate of cup-shaped form with the cup flange adjacent the wheel and firmly secured thereto in surrounding relation to a portion of the centrally projecting support, said plate being adjustably mounted on the wheel in a manner selectively to vary the stroke of the crank pin.

COLUMBUS R. SACCHINI.
WILLIAM WATERMAN.